United States Patent [19]

Vaughan

[11] Patent Number: 5,419,821

[45] Date of Patent: May 30, 1995

[54] PROCESS AND EQUIPMENT FOR REFORMING AND MAINTAINING ELECTROLESS METAL BATHS

[76] Inventor: Daniel J. Vaughan, 36 Paxon Dr., Wilmington, Del. 19803

[21] Appl. No.: 70,965

[22] Filed: Jun. 4, 1993

[51] Int. Cl.⁶ .............................................. B01D 61/44
[52] U.S. Cl. ........................ 204/182.4; 204/DIG. 13
[58] Field of Search ..................... 204/182.4, DIG. 13, 204/90

[56] References Cited

U.S. PATENT DOCUMENTS 5,225,052  7/1993  Takikawa et al. ..................... 204/90

Primary Examiner—John Niebling
Assistant Examiner—Arun S. Phasge
Attorney, Agent, or Firm—Herbert M. Wolfson

[57] ABSTRACT

Process and equipment for reforming and maintaining the chemistry of an electroless metal bath, particularly an electroless nickel bath is disclosed.

23 Claims, 2 Drawing Sheets

PROCESS AND EQUIPMENT FOR REFORMING AND MAINTAINING ELECTROLESS METAL BATHS

FIELD OF THE INVENTION

This invention relates to the process and equipment for reforming and maintaining the chemistry of an electroless metal bath, particularly an electroless nickel bath.

BACKGROUND OF THE INVENTION

Electroless plating refers to the autocatalytic or chemical reduction of metal ions in an aqueous solution to a metal which is deposited on a substrate. Components of the electroless plating bath include an aqueous solution of metal ions, reducing agents, complexing agents, bath stabilizers and a catalytic agent that operates at a specific metal ion concentration and within specific temperature and pH ranges. The base substrate, upon which the metal is plated, is usually catalytic in nature. Thus, the preferred preparation yields a substrate having a catalyzed surface and once the substrate is introduced into the electroless solution, uniform deposition begins. Minute amounts of the metal to be deposited on the substrate, i.e., nickel, will further catalyze the reaction. After the original surfaces are coated with metal, the deposition is autocatalytic. Electroless deposition then continues, provided that the metal ion and the reducing agent are replenished and the proper pH of the bath is maintained.

In electroless plating, metal ions are reduced to metal by the action of chemical reducing agents. The reducing agents are oxidized in the process. The catalyst may be the substrate or metallic surface on the substrate, as described above, which allows the reduction-oxidation reactions to occur with the ultimate deposition of metal on the substrate.

The metal ion and reducer concentrations must be monitored and controlled closely in order to maintain proper ratios and to maintain the overall chemical balance within the plating bath. The electroless plating deposition rate is controlled by selecting the proper temperature, pH and metal ion/reducer concentrations. Complexing agents may be used as catalyst inhibitors to reduce the potential for spontaneous decomposition of the electroless bath.

The chemical reducing agent most commonly used in electroless plating is sodium hypophosphite. Others include sodium borohydride, dimethylamine borane, N-diethylamine borane and hydrazine. The electroless nickel baths are generally of four types: (1) alkaline nickel phosphorus; (2) acid nickel phosphorus; (3) alkaline nickel boron; and (4) acid nickel boron.

The alkaline nickel phosphorus baths plate at relatively low temperatures which makes them suitable for plating on plastics, especially plastics used in the electronics industry. A typical composition of an alkaline nickel phosphorus bath is: nickel sulfate $-30$ g/l, sodium hypophosphite $-30$ g/l, sodium pyrophosphate $-60$ g/l, triethanol amine 100 ml/l, pH 10.0 and operated at 30–35 degrees C.

Acid nickel phosphorus baths are commonly used for engineering applications since the deposits of nickel-phosphorus are quite hard, with excellent wear and corrosion resistance. The pH of the bath is the principal factor affecting the phosphorus content of the deposit. In general, the higher the pH, the lower the phosphorus content of the deposit. A typical acid nickel bath is: nickel sulfate $-28$ g/l, sodium acetate $-17$ g/l, sodium hypophosphite $-24$ g/l, lead acetate $-0.0015$ g/l, pH 4.6 and operated at 82 to 88 degrees C. There are many potential and actual formulations for hypophosphite, borane and hydrazine reducing baths. However, in all cases the nickel ion is reduced to nickel and the reducing agent is mostly oxidized but, to a lesser extent, may be reduced to become part of the nickel deposit.

In practice, several reducing agents may be used to form composites of nickel with diamonds, silicon carbide and polytetrafluoroethylene for special uses; and several polyalloys are produced including nickel-cobalt-phosphorous, nickel-iron-phosphorus, nickel-rhenium-phosphorus, nickel-molybdenum-boron, nickel-tungsten-boron and others.

There are also many formulations that may be used as the electroless nickel baths. However, in any such bath, an oxidation-reduction reaction occurs which results in oxidation products and metallic nickel. The pH decreases with removal of metal cations leaving anions of the nickel salt or complexing agent and the oxidation products of the reducing agents; i.e., hypophosphite to phosphite. The nickel ion and the reducing agent concentrations decrease with deposition. It is essential that the complexing agents, bath stabilizers and other additives remain in the bath at acceptable concentrations as the nickel is being deposited to prevent spontaneous decomposition of the bath and to minimize the number of chemicals that must be monitored and controlled.

Currently used electroless nickel baths have a limited life. The pH of the bath must be constantly adjusted with either an acid, usually sulfuric acid, and a base, usually sodium hydroxide. The combination of hypophosphite oxidation producing a phosphite and the reduction of nickel ions to metallic nickel usually results in excess acidity. This requires the addition of sodium hydroxide to obtain the required pH.

Objects of the instant invention are (1) to provide a process for controlling pH of the bath with a substantial reduction in the need to add sulfuric acid or caustic soda; (2) to remove the oxidized reducing agent efficiently so that the other components of the bath (reducing agent, metal ions, complexing agents and bath stabilizer) can be used for several cycles; and (3) to facilitate operation of the bath by providing a process wherein metal ion concentration and pH are controlled effectively and efficiently with a minimum of effort.

SUMMARY OF THE INVENTION

The objects are accomplished by using an electrodialytic process in combination with the electroless metal, e.g. nickel, bath. Specifically, the process comprises (1) controlling the pH of the electroless metal bath by electrodialytically adding a controlled ratio of hydroxyl and acid anions from a catholyte of an electrochemical cell into the electroless nickel plating bath and electrodialytically removing anions from the bath to maintain the pH of the bath; (2) separating the desirable anions from the undesirable anions in the effluent from the electroless bath and adding (recycling) the desirable anions to the electroless bath, preferably from the catholyte of the electrodialytic cell; and (3) replenishing the metal ions and reducing agents as required to maintain the deposit rate of the metal in the electroless process.

Preferably, the electrodialytic process equipment useful in the instant invention comprises an electrochemical cell having four compartments, (a) a catholyte compartment separated by an anion permeable membrane from (b) a compartment containing the electroless metal bath; (c) an acid-forming compartment for receiving anions removed from the electroless bath through an anion permeable membrane; and (d) an anolyte compartment containing a dilute solution of an acid that is separated from the acid-forming compartment by a cation permeable membrane.

When a direct current is passed through the electrochemical cell, hydroxyl ions formed at the cell cathode and anions of the acids in the electroless bath are electrotransported from the catholyte to the electroless bath; and anions of desirable and undesirable acids in the electroless bath are electrotransported from the electroless bath into the acid-forming compartment where they are converted to acids by hydrogen ions electrotransported from the anolyte through the cation permeable membrane. The acids removed from the electroless bath are added to the catholyte of the cell containing agents to insolubilize the anions of the unwanted acids.

By controlling the pH of the catholyte, the ratio of hydroxyl ions and acid anions transported to the electroless bath control the pH of the electroless bath. Further control of the pH of the electroless bath is effected by the addition of metal, e.g. nickel, ions and by controlling the rate of electrotransport of anions from the bath and the electrotransport of hydroxyl ions and anions from the catholyte into the electroless bath. The unwanted acid anions in the catholyte are insolubilized and removed.

DETAILED DESCRIPTION OF THE INVENTION

Basically, the process of the invention is directed to reforming and maintaining the chemistry of an electroless metal bath. For the sake of clarity, the electroless nickel bath will be discussed. However, those skilled in the art can formulate similar processes within the scope of the invention for other metals.

Figure 1:
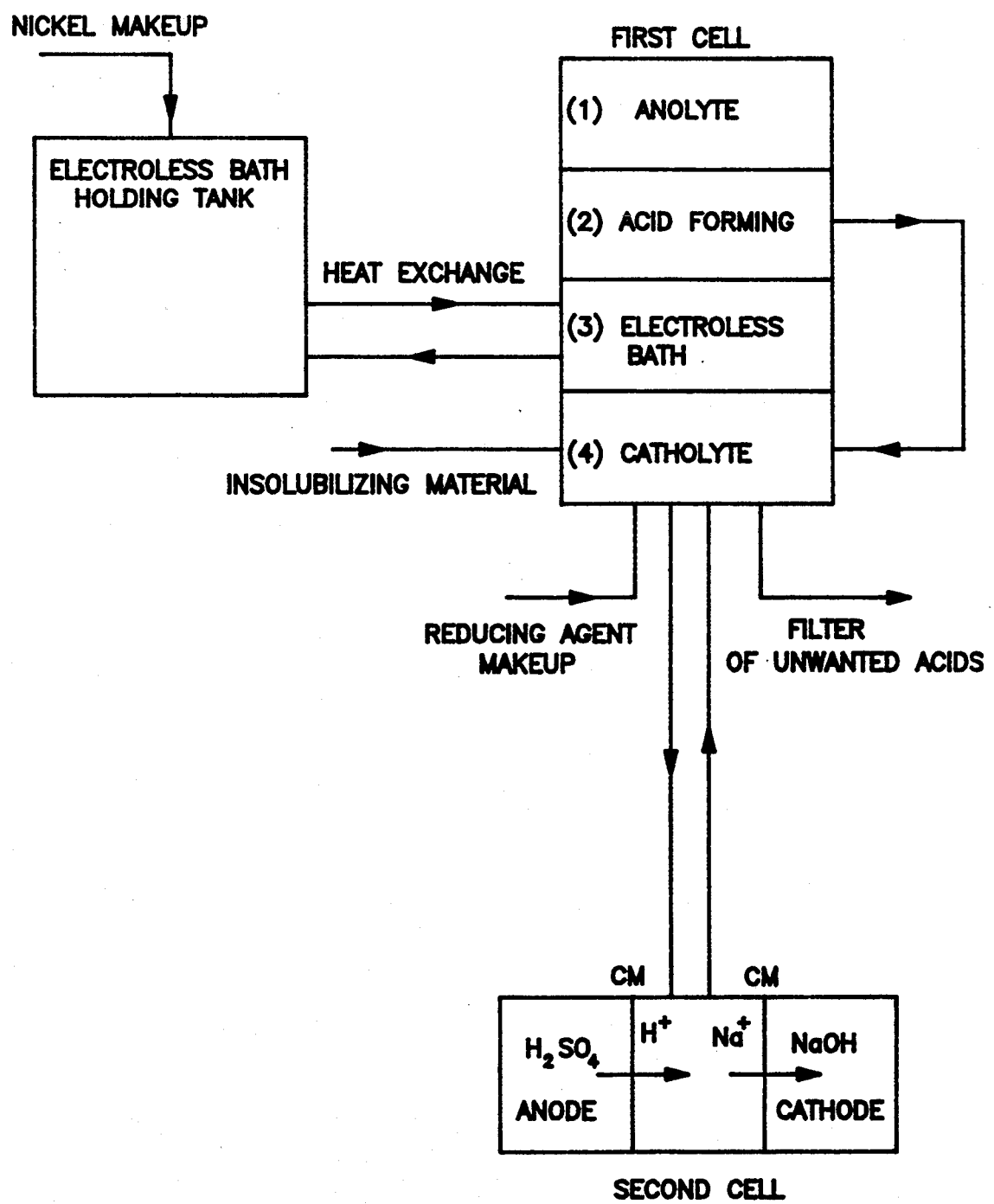
FIG. 1 is a schematic representation of the process of the instant invention.
Figure 2:
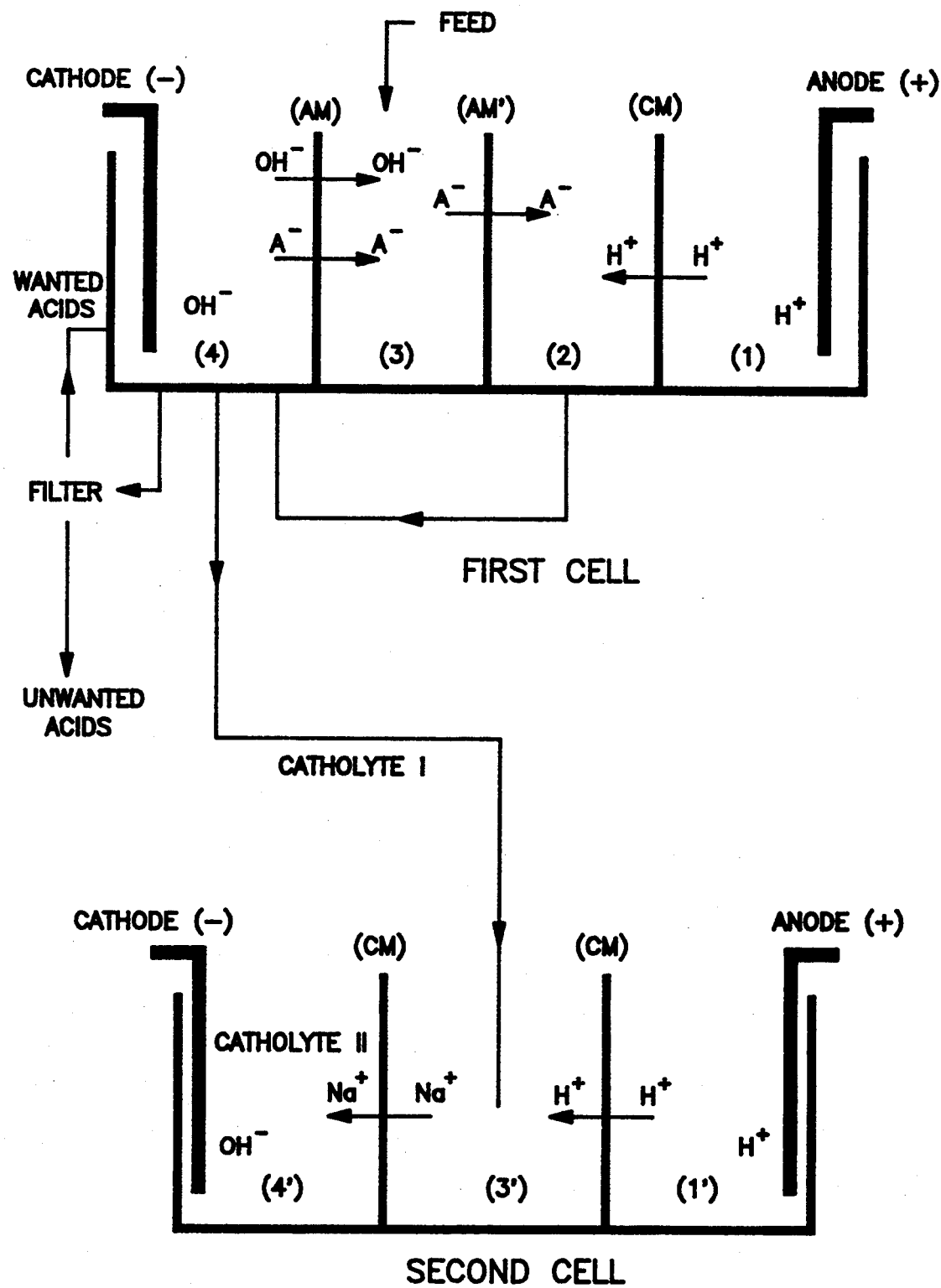
FIG. 2 is another schematic representation showing greater detail of the electrolytic cells used in the process.

Referring to FIGS. 1 and 2, it will be noted that the first cell is composed of four compartments; and the second is composed of three compartments.

Compartment (1) in the first electrodialytic cell is the anolyte compartment that contains an anode and an aqueous anolyte separated from Compartment (2) by a cation permeable membrane (CM). Compartment (2) contains an electrolyte comprising anions removed from Compartment (3) which contains the electroless nickel bath. Compartment (3) is separated from Compartment (2) and Compartment (4) by anion permeable membranes (AM) and (AM1). Compartment (4) is the catholyte compartment containing a cathode and aqueous catholyte.

This arrangement in the first cell provides for separation of the electroless nickel bath in Compartment (3) from reduction reactions at the cell cathode in Compartment (4) and the anions in Compartment (2). The anions in Compartment (2) had been removed from the electroless nickel bath in Compartment (3) from oxidation reactions at the cell anode in Compartment (1). Separation of the electroless nickel bath by anion permeable membranes from other compartments and electrolytes substantially reduces or eliminates the electrotransport of cations and cationic additives, complexing agents and stabilizers from the bath while permitting the removal of anions and addition of anions to the electroless nickel bath.

The addition of anions is controlled by the composition of the catholyte and the removal of the anions is controlled by the composition of the electroless nickel bath. The pH of the electroless nickel bath may be increased by the addition of hydroxyl ions for acid anions removed from the bath into Compartment (2). The pH of the electroless bath is decreased by removal of hydroxyl ions from the electroless bath and replacing the hydroxyl ions removed with anions from the catholyte or by the addition of an acid to the electroless nickel bath.

When an electric current is passed through the electrodialytic cell, water is oxidized at the cell anode to form oxygen and hydrogen ions; and water is reduced at the cell cathode to form hydrogen and hydroxyl ions. The hydrogen ions electrotransported from the anolyte in Compartment (1) through the cation permeable membrane (CM) form acids (with the anions of acids removed from the plating solution) and water (with hydroxyl ions removed from the plating solution). The hydroxyl ions, electrotranspoded from the catholyte to the electroless nickel bath, form hydroxides with alkali and/or other metal ions in the plating solution; and the anions, electrotransported from the catholyte to the electroless nickel solution, form salts with the alkali and metal cations and acids with hydrogen ions. Fortunately, the electrons produced at the electrodes provide the correct number of positive and negative charges.

The electrolyte in Compartment (2) usually contains a mixture of acids including the reducing acid as well as the acids of anions that are formed when the reducing agent is oxidized. To control pH and the composition of the electroless nickel bath, it is necessary to remove the undesired oxidation products and to replace the desired anions at the same rate that they are removed from the electroless nickel bath. Thus, the $Ni^{++}$ ions must be replenished at the same rate that nickel metal is deposited on the substrate; and the reducing agent that is oxidized must be replenished.

For effecting maximum usage of the reducing agent and for minimizing waste to the environment, it is desirable to separate the desirable or wanted acids from the undesirable or unwanted acids (oxidation products of reducing agent) and to reuse the wanted acids. The wanted acids may be added to the electroless bath along with nickel ions and reducing agent; or the wanted acids could be added to the catholyte and electrotransported to the electroless bath. A preferred method for separating and reusing the acids removed from the electroless nickel bath is: (1) to add the removed acids to the catholyte containing an agent that insolubilizes the unwanted acids; (2) to electrotransport the wanted anions of the wanted acids from the catholyte to the electroless nickel bath; (3) to insolubilize the unwanted anions and remove the resulting solids from the catholyte; and (4) to control the pH of the catholyte whereby the ratio of hydroxyl ions to acid anions electrotransported from the catholyte to the electroless nickel bath provides the desired pH in the electroless nickel bath.

The process of the instant invention can be carried out in electrodialytic cells having three or more compartments. The compartments can be separated by all anion permeable membranes or combinations of anion, cation and bipolar membranes provided that the catholyte compartment is separated by an anion permeable membrane from the compartment containing the electroless bath and the electroless bath is separated by an anion permeable membrane from compartments facing the anode of the cell. Preferably, the anolyte Compartment (1) containing the anode is separated by a cation permeable membrane from other cell compartments to prevent chemicals, i.e., reducing agents, halides, complexing agents, etc. from being subjected to oxidation at the cell anode. It will be obvious that anions of acids could be separated in compartments of a cell other than the cathode compartment by selectively insolubilizing or ionically immobilizing unwanted anions and electrotransporting wanted anions through an anion permeable membrane. Preferably, the anions of acids are separated by adding an insolubilizing agent to the catholyte in Compartment (4) of the electrodialytic cell, as shown in FIG. 1.

The anolyte of the instant process is an aqueous solution of an acid, a mixture of acids or a mixture of acids and salts of acids. Preferably, the anolyte is a solution of an acid that is oxidatively stable to anodic reactions. The anolyte may contain cationic agents that can be electrotransported through a cation permeable membrane into the acid-forming compartment, the cationic agents being suitable for selectively insolubilizing or ionically immobilizing anions of acids. Thus, the cationic agent may contain magnesium ions that form substantially insoluble salts with phosphite ions.

The catholyte of the process of this invention can be any aqueous solution suitable for electrotransporting hydroxyl ions and mixtures of hydroxyl ions and anions of acids from the catholyte through an anion permeable membrane into the electroless plating bath. Preferably, the anions of acids are the anions wanted in the electroless bath. The pH of the catholyte can be higher or lower than 7.0 but sufficient to effect the desired electrotransport of hydroxyl ions to increase the pH of the electroless bath and anions of acids to decrease the pH of the electroless bath. Preferably, the catholyte contains an agent or agents that is or are suitable for selectively insolubilizing or ionically immobilizing unwanted anions of acids in the catholyte.

Agents that insolubilize anions of acids or complexes, or chelate anions of acids to form complexes that have no charge or a positive charge, are generally available in the literature. For example, magnesium ions form substantially insoluble salts with phosphite ions and substantially soluble salts with hypophosphite anions. This characteristic of magnesium ion is of special interest in separating the unwanted phosphite anions (the oxidation product of the hypophosphite reducing agent) from the hypophosphite anion whereby the hypophosphite can be reused as a reducing agent in the electroless plating bath.

The preferred agents for separating anions of acids are those agents which form insoluble salts, complexes or compounds that can be removed from the catholyte or from an aqueous solution other than the catholyte, by filtration or other means of separating solids from liquids. The agent can be added to the catholyte or another aqueous solution in the solution as the oxide, hydroxide, salt or compound in solid or solution form. Preferably, the agent is soluble in the catholyte but forms insoluble materials with unwanted acid anions at a pH suitable for electrotransporting hydroxyl ion and anions of acids to the electroless plating bath for adjusting or controlling the pH of the electroless bath.

For example, magnesium and calcium ions form soluble hydroxides and some soluble salts at a pH up to about eleven (11) but form insoluble magnesium phosphite. The latter can be easily removed from the catholyte containing soluble magnesium or calcium ions by methods discussed previously. Barium ions form substantially insoluble salts with sulfate ions and soluble salts with hypophosphite ions. The products can be similarly separated and the insoluble product removed.

It is preferable that most of the unwanted anions be removed from the catholyte. However, this is not essential for each cycle where anions removed from the electroless bath are reused.

The hypophosphite and other suitable agents to reduce nickel ions can be added to the electroless bath as acids or nickel salts in the instant process for reforming the electroless bath. When the hypophosphite is to be added as an alkali salt it is preferable to add the alkali salt to the catholyte and electrotransport the hypophosphite anion from the catholyte to the electroless bath to avoid a build-up of alkali ions in the electroless bath.

Preferably, the alkali ions are removed from Catholyte I as shown in FIG. 2 in a second electrodialytic cell that also has a Catholyte II, a feed electrolyte and an anolyte separated by cation permeable membranes, as also shown in FIG. 2. Catholyte I is fed to the second cell as the feed electrolyte whereby alkali cations are electrotransported from the feed solution to the catholyte and converted with hydroxyl ions formed at the cell cathode to alkali hydroxides. The anolyte is preferably an acidic solution suitable for forming hydrogen ions at the anode and electrotransporting hydrogen ions from the anolyte to the feed electrolyte. Preferably, the pH of the feed electrolyte is greater than 7.0.

Any cation permeable membrane, anion permeable membrane, bipolar membrane or other suitable separator can be used in the process of this invention that is chemically stable to the electrodialytic environment and mechanically suitable for design, construction and operation of the electrodialytic process. Perfluorocarbon membranes, such as Nafion ® 417*, are a preferred cation permeable membrane for an oxidizing media containing chloride ions. The preferred anion permeable membranes are those membranes suitable for use in alkaline solutions, such as Sybron ® MA 3475 and Tosflex ® IESF 34* fluorinated anion exchange membrane. The alkali cations of the process of this invention may be a cation of an alkali metal or ammonium and, preferably, a cation of potassium or sodium.

* A perfluorinated membrane manufactured by E. I. dupont de Nemours Co.
** Manufactured by Sybron Chemicals
*** Manufactured by Tosho Cathodes for the process of this invention may be any electrically conductive material resistant to the catholyte. Such materials are iron, stainless steel, nickel, titanium with nickel coatings, reduced oxides of titanium and the like. While solid cathodes may be used, foraminous cathodes are preferred.

Anodes for the process of this invention may be any electrically conductive, electrolytically active material resistant to the anolyte. Materials such as a valve metal of titanium, tantalum or alloys thereof bearing on its surface a noble metal, a noble metal oxide, either alone or in combination with a valve metal oxide, lead dioxide or other electrolytically active materials, are generally preferred. The anodes may be of a ceramic of reduced oxides of titanium such as Ebonex® from Ebonex Technologies. The anodes may be solid, but foraminous anodes are generally preferred.

The electroless metal bath of the process of this invention is any electroless bath containing metal ions and a reducing agent. The metal may be a pure metal or a metal alloy of nickel, cobalt, gold, platinum or palladium. The reducing agent is preferably hypophosphorous acid or a salt of hypophosphorous acid. The hypophosphite ion forms an oxidation product that can be electrotransported through an anion permeable membrane and separated from the reducing agent in the bath by insolubilization. The electroless nickel bath may contain two or more metal cations, complexing agents, stabilizers and other agents to control the deposition of the metal cations. The electroless bath may contain particles of diamond, ceramic, silicon carbide, polytetrafluoroethylene or other materials and additives to modify and enhance the properties of the deposited metal.

To illustrate further the practice of the instant invention, reference is again made to FIG. 1. An electrolytic cell having four compartments separated by ion permeable membranes was used. The electrolysis area based on the area of one membrane surface in contact with an electrolyte was 929 sq. cm. The cell was equipped for circulating the electroless bath to a holding tank and back through a heat exchanger to Compartment (3) of the cell to effect addition of metal ions and other agents and for maintaining pH.

Compartment (1) contained a titanium mesh anode coated with iridium oxide and a 2 wt. % solution of sulfuric acid as the anolyte. Compartment (1) was equipped with conduits for releasing gases resulting from electrolysis and for the addition of water.

Compartment (2), the acid-forming compartment, was equipped for the addition of water and the removal of the reformed acids.

Compartment (4) contained a nickel coated titanium mesh cathode, a catholyte and conduits for release of gases of electrolysis and for circulating the catholyte to the holding tank.

The holding tank shown in FIG. 1 was equipped for measuring pH, removal of catholyte for separation of solids and for the return of the catholyte free of solids.

Electrical power was supplied by a rectifier equipped for operation at a fixed voltage and variable current or variable voltage and fixed current.

Provisions were made for sampling all electrolytes and controlling the respective volumes of the electrolytes. Most of the electroless bath solutions were obtained from companies using the solutions commercially. The filtrate of the catholyte was tested for anions and the solids removed from the catholyte were tested for acid anions.

The following examples are further illustrations of the instant process. There is no intent to limit the scope of the invented process or equipment to the disclosures in these examples. This invention provides for the maintenance of pH and anion composition of an electroless bath with effective utilization of the reducing agent and the acid anions and the minimization of waste from the electroless bath for deposition of metals on substrates. In the examples, electroless deposition was carried out batchwise and, for shod periods, continuously with removal and addition of anions to maintain pH of the bath and to recycle the wanted acids.

EXAMPLES

Example 1

An electroless plating solution, consisting of 28 g/l nickel sulfate, 24 g/l sodium hypophosphite, 17 g/l sodium acetate, 0.002 g/l lead acetate, and having a pH of 4.6, was added to Compartment (3) and heated to 70 degrees C. A 2 wt. % solution of sulfuric acid was added as the anolyte in Compartment (1). A solution of 1 wt. % sodium hypophosphite and 1 wt. % sulfuric acid was added as the initial electrolyte in the acid-forming Compartment (2) and as the catholyte Compartment (4), respectively.

Electricity was passed through the cell at 55 amperes until the pH of the electroless bath was in the range of 4.3 to 4.8 and the electroless deposition initiated. The amperage was then adjusted to 120 amperes. The pH of the catholyte was adjusted by the addition of magnesium hydroxide and acids from the acid reforming compartment. The pH of the catholyte was varied as required to maintain the pH of the electroless bath. The pH of the catholyte was adjusted over the range of 10.5 to 6.0. The catholyte was filtered periodically to remove magnesium phosphite and the magnesium replaced to effect essentially complete insolubilization of phosphite. When nickel was added as nickel sulfate, the excess sulfate was removed by the addition of a limited amount of barium carbonate to the catholyte to form insoluble barium sulfate.

The electroless deposition was not continuous in this small scale process and it was not possible to determine if any imbalances in pH, hypophosphite, nickel, etc., adversely affected the electroless deposition. For commercial use, it should be possible to effectively control each step in the continuous reforming and maintenance of the electroless solution.

Example 2

The reforming system of Example 1 was used for Example 2. The electroless bath of Example 1 was replaced with a bath of 33 g/l of nickel sulfate, 84 g/l of sodium citrate; 50 g/l of ammonium chloride, 17 g/l of sodium hypophosphite, having a pH of 9.2 at 80 degrees C. The electrolysis was carried out at 95 amperes with electroless plating at intervals. The pH of the bath was controlled in the range of 9.0 to 10.0 by adjusting the pH of the catholyte. The pH of the catholyte and composition of the catholyte were adjusted and controlled by the addition of alkali salts of hypophosphite and the recovered acids. The pH of the catholyte ranged from 10 to 13. Magnesium ion was added to the catholyte to insolubilize phosphite ions and barium ion added to remove sulfate. Nickel ion was added as nickel sulfate. The insolubilized anions were equivalent to 93–95% of theory for the nickel deposited. It was necessary to make small adjustments for chloride and citrate to maintain the composition and deposition rate of nickel.

This example shows that, with some adjustments, the unwanted phosphite and excess sulfate can be removed from the bath to maintain the composition of the electroless bath; and an adjustment of the pH of the catholyte with recovered anions and hydroxyl ions formed at the cathode provides for pH control and the return of desirable anions. The electroless bath maintained its composition for over four days of operation.

Example 3

The equipment used in Examples 1 and 2 was replaced with an electrochemical cell having an electrolysis area of 45 sq. cm. Compartment (3) containing the electroless solution had a 1 liter cylindrical vessel associated with it for holding and flowing the solution through the electroless solution compartment. The anolyte in Compartment (1) was a 2 wt. % solution of sulfuric acid. The catholyte in Compartment (4) was composed of sodium salts of the anions in the electroless bath in approximately the same ratio as in the electroless bath.

Electric current was passed through the cell at 15 amperes. The composition of the acids in the acid reforming compartment was analyzed and the pH of the electroless bath and catholyte was measured. Periodically, nickel sulfate and pH controller were added to effect deposition. Acids from the acid-forming Compartment (2) were added to the catholyte with magnesium carbonate to insolubilize the phosphite.

The following electroless solutions were tested with satisfactory results: (a) 30 g/l of cobalt chloride; 20 g/l sodium hypophosphite, 40 g/l ammonium chloride; 40 g/l sodium citrate at a pH of 9.5 and 75 degrees C. (b) 20 g/l palladium chloride; 10 g/l of EDTA, 10 g/l sodium hypophosphite; 0.5 g/l of thiourea at a pH of 8.0 and 60 degrees C.

The experiments indicate that the composition of electroless baths can be maintained electrodialytically with (a) removal of acid anions from the bath; and (b) adding the anions to the catholyte of the electrodialytic cell with insolubilization of the unwanted anions and reuse of the wanted anions. The pH of the electroless bath can be continuously controlled by removal of anions and replacement of the anions of acids and hydroxyl ions formed at the cell cathode. Thus, the process of the instant invention is broadly useful for maintaining this composition of electroless plating solutions.

What is claimed is:

1. A process for reforming and maintaining the composition of a bath containing an electrolyte for electroless deposition of a metal or an alloy of a metal onto a substrate by interposing a bath containing an electrolyte in a compartment between the two compartments of an electrochemical cell so that the cell comprises a cathode and an associated catholyte in a first compartment, an anode and an associated anolyte in a second compartment and said bath containing an electrolyte in the third compartment therebetween, said three compartments being separated by two permeable membranes, said bath in the third compartment also containing an agent to reduce metal cations to metal for deposition on said substrate and to form anions upon oxidation that are electrotransportable from said bath through an anion permeable membrane, the process comprises: (a) electrotransporting said anions from said bath in the third compartment through an anion permeable membrane into the anolyte in the acid-forming second compartment of said cell (b) adding a material to said anolyte to form an insoluble compound with said anions from said third compartment and an electrolyte in said second compartment (c) separating said insoluble compound from said electrolyte in said second compartment (d) adding said electrolyte to a catholyte in said first compartment of said cell (e) electro-transporting anions of said agent from said catholyte to said bath to reduce metal cations to metal or an alloy of said metal and (f) depositing said metal or alloy of metal on a substrate.

2. The process of claim 1 wherein said metal is a pure metal or metal alloy selected from the group consisting of nickel, cobalt, gold, platinum and palladium.

3. The process of claim 1 wherein said agent to reduce cations of metals is hypophosphorus acid or salts of hypophosphorus acid.

4. The process of claim 1 wherein said agent to reduce cations of metals on oxidation forms phosphite anions.

5. The process of claim 1 wherein said material added to said electrolyte contains calcium, magnesium or barium ions.

6. A process for the electroless deposition of a metal on a substrate from a bath containing a feed electrolyte of metal cations using an electrodialytic cell for reforming and maintaining the composition of said bath, said bath also containing a reducing agent to reduce the metal cations to metals and to form anions on oxidation that are electrotransportable from said bath through an anion permeable membrane and form insoluble compounds with materials which comprises: (a) feeding said bath containing said metal cations and said reducing agent to an electrodialytic cell having at least an anolyte separated by a cation permeable membrane from an acid-forming electrolyte, the feed electrolyte and a catholyte separated by anion permeable membranes (b) passing an electric current through said cell to form hydrogen ions in said anolyte and hydroxyl ions in said catholyte (c) electrotransporting anions of said reducing agent and anions formed on oxidation of said reducing agent from said bath as said feed electrolyte to said acid-forming electrolyte and converting said anions of said reducing agent to acids with hydrogen ions electrotransported from said anolyte (d) adding a material to said acid-forming electrolyte or adding said acid-forming electrolyte to said catholyte having said material therein to form an insoluble compound with said anions formed on oxidation of said reducing agent and soluble compounds with anions of said reducing agent (e) separating said insoluble compound from said soluble compounds (f) feeding said soluble compound to said catholyte and electrotransporting anions of said soluble compound from said catholyte to said bath as said feed electrolyte.

7. The process of claim 6 wherein said metal cation is a cation of nickel or cobalt.

8. The process of claim 6 wherein said agent to reduce metal cations is hypophosphorus acid or a salt of hypophosphorus acid.

9. The process of claim 6 wherein said material to form an insoluble compound is magnesium ions.

10. A process using an electrochemical cell for reforming and maintaining the composition of a bath containing a first electrolyte of a reducing agent and an electrolyte of nickel cations for electroless deposition of nickel, said cell comprising at least three compartments, a cathode and associated catholyte in one compartment, said electrolyte of nickel and said reducing agent in a second compartment and an anode and associated anolyte in a third compartment, said compartments separated by permeable membranes, the process comprising (a) passing an electric current through said cell to form hydrogen ions at the anode and hydroxyl ions at the cathode (b) feeding said bath of reducing agent and nickel cations to said cell as said first electrolyte (c) electrotransporting anions from said first electrolyte to said anolyte to form acids or salts with hydrogen ions or metal cations in said anolyte (d) electrotransporting hydroxyl ions from said catholyte to said first electrolyte sufficient to control the pH of said first electrolyte (e) adding said anolyte to said catholyte containing materials to form insoluble compounds with anions formed on oxidation of said reducing agent in said catholyte (f) removing said insoluble compounds from said catholyte (g) electrotransporting anions of said reducing agent in said catholyte to said first electrolyte to replace anions of said reducing agent removed from said first electrolyte to said anolyte (h) adding anions of an agent capable of reducing nickel ions to nickel to said first electrolyte to maintain the composition of said first electrolyte (i) adding nickel ions to said first electrolyte to maintain the composition of said first electrolyte (j) removing alkali cations from said catholyte to adjust and control the pH of said catholyte.

11. The process of claim 10 wherein the pH of said catholyte is controlled at a value sufficient for electrotransporting hydroxyl ions from said catholyte to said electroless nickel bath at substantially the same rate as said anions added to said catholyte and electrotransported from said catholyte to said nickel bath.

12. The process of claim 10 wherein said alkali cations are removed from said catholyte in an electrodialytic cell having at least an anolyte and a catholyte.

13. The process of claim 10 wherein said reducing agent is hypophosphorous acid or nickel hypophosphite.

14. A process for the electrodialytic reforming and maintaining of a bath containing a reducing agent for electroless deposition of nickel in an electrochemical cell having at least a catholyte, a first electrolyte and a second electrolyte separated by anion permeable membranes and an anolyte separated from said second electrolyte by a cation permeable membrane which comprises (a) passing an electric current through said cell to form hydrogen ions in said anolyte and hydroxyl ions in said catholyte (b) feeding said electroless nickel bath to said cell as said first electrolyte (c) electrotransporting hydroxyl ions from said catholyte to said first electrolyte to control pH of said first electrolyte (d) electrotransporting anions from said first electrolyte to said second electrolyte (e) electrotransporting hydrogen ions or metal cations from said anolyte to said second electrolyte to form acids or salts in said second electrolyte (f) adding said second electrolyte to said catholyte containing materials to form insoluble compounds or ionically immobile compounds with anions resulting from the oxidation of said reducing agent (g) removing said insoluble compounds or said immobile compounds from said catholyte (h) electrotransporting anions of said reducing agent from said catholyte to said first electrolyte to replace such anions removed from said first electrolyte to said second electrolyte (i) adding to said first electrolyte anions of an agent to reduce nickel ions to nickel to maintain the composition of said first electrolyte and (j) adding nickel ions to said first electrolyte to maintain the composition of said first electrolyte.

15. The process of claim 14 wherein said anions of an agent to reduce nickel are hypophosphite.

16. The process of claim 14 wherein said anions of an agent to reduce nickel ions are added to said first electrolyte as hypophosphorous acid or nickel hypophosphite.

17. The process of claim 14 wherein said anions of an agent to reduce nickel are electrotransported from said catholyte to said first electrolyte.

18. The process of claim 14 wherein said materials to form insoluble compounds or ionically immobile compounds are cations selected from the group consisting of magnesium, calcium or barium or mixtures of said cations.

19. The process of claim 18 wherein said first electrolyte is a bath for electroless deposition of nickel having an agent to reduce nickel and the oxidation product of said agent is an anion electrotransportable through an anion permeable membrane to form insoluble or ionically immobile compounds.

20. A process using an electrochemical cell for reforming and maintaining a bath containing an alkali salt of an agent to reduce nickel ions to nickel for electroless deposition of nickel which comprises (a) passing an electric current through said cell to form hydrogen ions at the cell anode and hydroxyl ions at the cell cathode, said cell having at least a catholyte, a first electrolyte and a second electrolyte separated by anion permeable membranes and an anolyte separated by a cation permeable membrane from said second electrolyte (b) feeding said bath to said cell as said first electrolyte (c) electrotransporting anions of said agent to reduce nickel ions from said first electrolyte to said second electrolyte (d) electrotransporting hydrogen ions or a metal cation from said anolyte to said second electrolyte to form acid or salt in said second electrolyte (e) electrotransporting hydroxyl ions from said catholyte to said first electrolyte to replace said anions of said agent to reduce nickel ions electrotransported from said first electrolyte to control the pH of said first electrolyte (f) adding said second electrolyte to said catholyte having materials to form insoluble compounds or ionically immobile compounds with anions formed upon oxidation of said agent to reduce nickel ions (g) separating said insoluble compounds or said immobile compounds from said catholyte (h) electrotransporting anions of said agent to reduce nickel ions from said catholyte to said first electrolyte to replace such anions removed from said first electrolyte (i) adding an alkali salt of an agent to reduce nickel ions to nickel in said catholyte (j) electrotransporting anions of said alkali salt from said catholyte to said first electrolyte to replace anions of said alkali salt oxidized in the reduction of nickel ions to nickel (k) electrotransporting said alkali ions of said alkali salt from said catholyte to adjust the pH of said catholyte (l) adding nickel cations to said first electrolyte to maintain the composition of said first electrolyte.

21. The process of claim 20 wherein said cations electrotransported from said anolyte to said second electrolyte are materials to insolubilize said anions formed upon oxidation of said agent to reduce nickel ions electrotransported from said first electrolyte to said second electrolyte.

22. The process of claim 21 wherein said materials to form insoluble compounds with said anions are cations selected from the group consisting of magnesium, calcium, barium or mixtures of said cations.

23. The process of claim 20 wherein the pH of said catholyte is controlled by removal of said alkali cations from said catholyte in a second electrodialytic cell having at least an anolyte compartment and a catholyte compartment separated by a cation permeable membrane.

* * * * *